(12) United States Patent
Daigle

(10) Patent No.: US 8,171,044 B2
(45) Date of Patent: May 1, 2012

(54) METHODS, SYSTEMS, AND PRODUCTS FOR RECOMMENDING SOCIAL COMMUNITIES

(75) Inventor: Brian K. Daigle, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 452 days.

(21) Appl. No.: 11/900,732

(22) Filed: Sep. 13, 2007

(65) Prior Publication Data
US 2009/0077064 A1   Mar. 19, 2009

(51) Int. Cl.
*G06F 17/30* (2006.01)
(52) U.S. Cl. ............... 707/769; 725/35; 705/319
(58) Field of Classification Search .......... None
See application file for complete search history.

(56) References Cited

U.S. PATENT DOCUMENTS

| | | | |
|---|---|---|---|
| 6,519,771 B1 | 2/2003 | Zenith | |
| 7,707,246 B1 * | 4/2010 | Issa et al. | 709/204 |
| 2003/0078972 A1 | 4/2003 | Tapissier | |
| 2004/0111467 A1 | 6/2004 | Willis | |
| 2004/0117831 A1 | 6/2004 | Ellis | |
| 2004/0143633 A1 * | 7/2004 | McCarty | 709/206 |
| 2005/0071884 A1 | 3/2005 | Champel | |
| 2005/0132401 A1 | 6/2005 | Boccon-Gibod | |
| 2005/0149987 A1 | 7/2005 | Boccon-Gibod | |
| 2005/0262542 A1 * | 11/2005 | DeWeese et al. | 725/106 |
| 2006/0123080 A1 | 6/2006 | Baudino | |
| 2006/0221173 A1 * | 10/2006 | Duncan | 348/14.02 |
| 2006/0271961 A1 | 11/2006 | Jacoby | |
| 2006/0282851 A1 | 12/2006 | Errico | |
| 2007/0005750 A1 * | 1/2007 | Lunt et al. | 709/223 |
| 2007/0282621 A1 * | 12/2007 | Altman et al. | 705/1 |
| 2008/0301112 A1 * | 12/2008 | Wu | 707/5 |

* cited by examiner

*Primary Examiner* — Neveen Abel Jalil
*Assistant Examiner* — Kevin L Young
(74) *Attorney, Agent, or Firm* — Scott P. Zimmerman PLLC

(57) ABSTRACT

Methods, devices, and products are disclosed for recommending a social community. A "social community" may be any individual(s), clubs, and/or organizations that have expressed some affinity to terms or subject matter, such as a media identifier. The media identifier identifies some media that is scheduled for recording. A community database is queried for the media identifier, and the community database associates social communities to media identifiers. The social community associated with the media identifier is retrieved. The social community is then sent to a user.

19 Claims, 16 Drawing Sheets

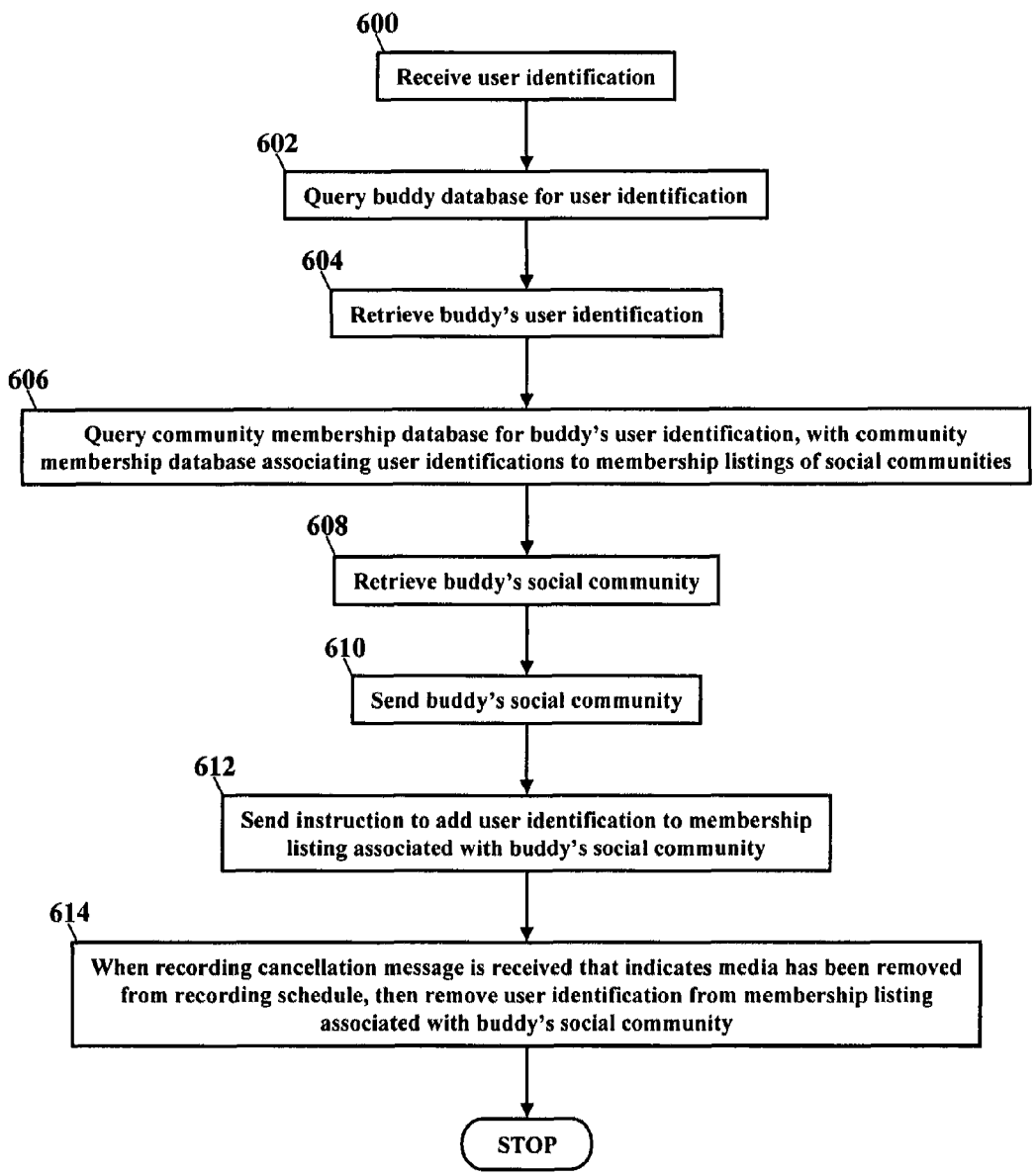

METHODS, SYSTEMS, AND PRODUCTS FOR RECOMMENDING SOCIAL COMMUNITIES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to operator interfaces and to interaction.

Many people enjoy movies, TV programs, music, and even games. Many people would enjoy meeting others who share an interest in a show, game, or movie. Some people, for example, greatly enjoy the STAR WARS® movies and would like to meet other people who share their interest. Some people who enjoy jazz music may wish to meet others who share that same enjoyment.

SUMMARY

The aforementioned problems, and other problems, are addressed, according to exemplary embodiments, by methods, systems, and products that recommend social communities to users. The term "social community," as used herein, includes any individual(s), clubs, and/or organizations that have expressed some affinity to terms or subject matter. A social community, for example, may be a website, chat room, distribution list, and/or individual user who has expressed some association, likeness, relationship, attraction, or, in general, affinity with a term or subject. Some exemplary embodiments, for example, describe a method that receives a media identifier. The media identifier identifies a movie, program, game, music, or other media for which the user has expressed an interest. A community database may be queried for the media identifier, and the community database associates social communities to media identifiers. The social community associated with the media identifier is retrieved. The social community is then sent to the user.

In another exemplary embodiment, a system is disclosed for recommending a social community. The system is operative to receive a media identifier and query a community database for the media identifier. The community database associates social communities to media identifiers. The social community associated with the media identifier is retrieved. The social community is then sent to the user.

More exemplary embodiments describe a computer program product for recommending a social community. The computer program product includes processor-executable instructions for receiving a media identifier and for querying a community database for the media identifier. The community database associates social communities to media identifiers. The social community associated with the media identifier is retrieved. The social community is then sent to the user.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein:

FIG. 16 is a flowchart illustrating another method for recommending social communities, according to more exemplary embodiments.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Figure 1:
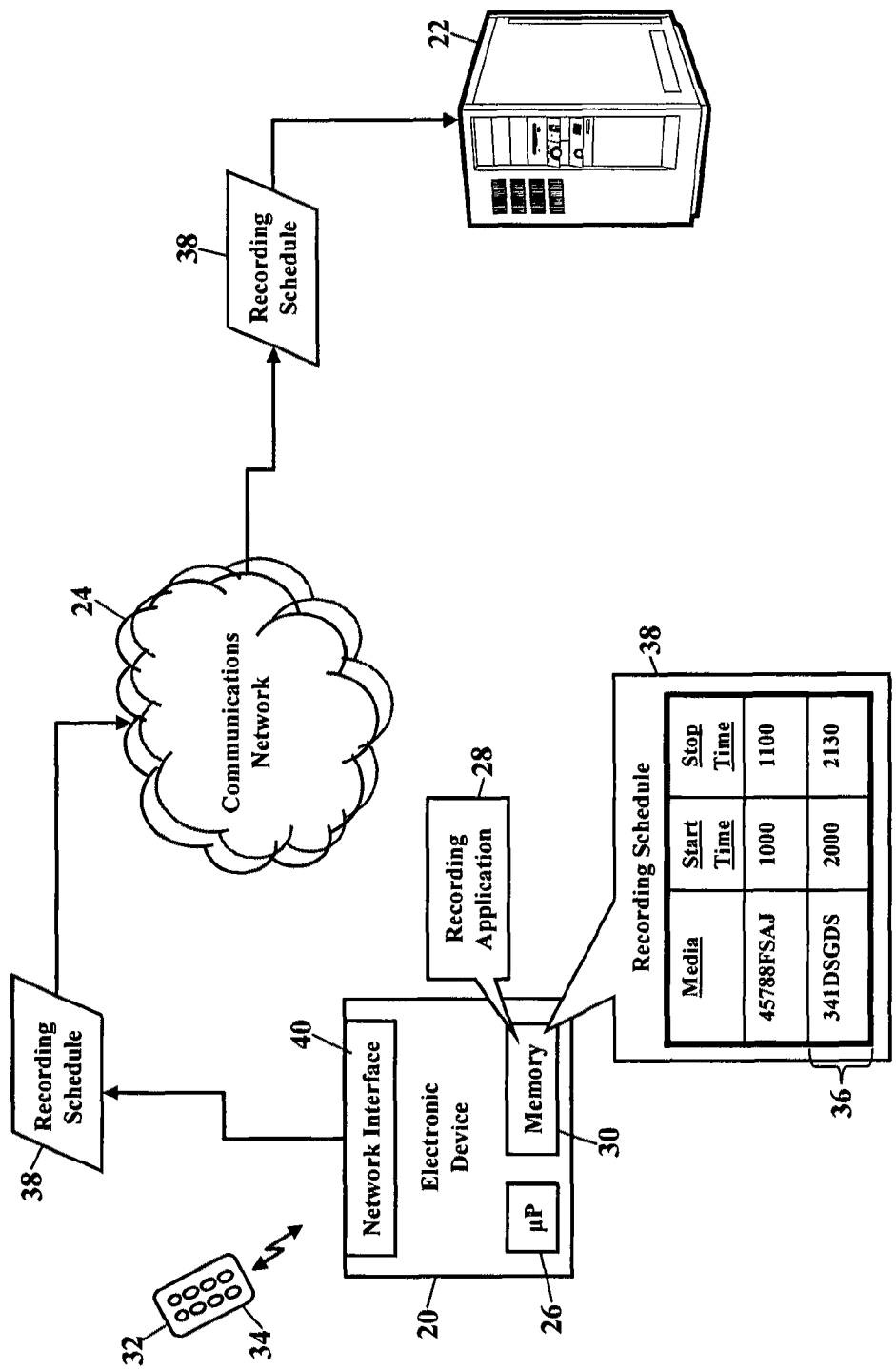
FIGS. 1-3 are schematics illustrating an operating environment, according to exemplary embodiments.

FIG. 1 is a schematic illustrating an operating environment, according to exemplary embodiments. FIG. 1 illustrates a user's electronic device 20 communicating with a server 22 via a communications network 24. Although the user's electronic device 20 is generically shown, as later paragraphs will explain, the electronic device 20 may be a computer, set-top box, digital recorder, or any other device. Whatever the user's electronic device 20, the user's electronic device 20 may have a processor 26 (e.g., "µP"), application specific integrated circuit (ASIC), or other similar device that executes a recording application 28 stored in memory 30. According to exemplary embodiments, the recording application 28 may include processor-executable code or instructions that cause the processor 26 to record some media (e.g., movie, music, programming, and/or image). The processor 26 may also communicate with a user interface 32 for indicating what media is to be recorded. The user interface 32 is illustrated as a remote control 34, but the user interface 32 may be a control panel, keypad, keyboard, display, or any other means for receiving spoken or tactile inputs. The processor 26 receives an input via the user interface 32, and the input instructs the processor 26 to create an entry 36 in a recording schedule 38. The recording schedule 38 is stored in the memory 30 and may identify the media selected for recording.

The server 22 receives the recording schedule 38. Whenever the user desires to schedule recording of a programming event or media, the processor 26 may inform the server 22. As FIG. 1 illustrates, the recording application 28 may instruct the processor 26 to invoke a network interface 40 to communicate the recording schedule 38 to the server 22. The processor 26 thus sends the recording schedule 38 via the communications network 24 to the server 22. The recording application 28 may instruct the processor 26 to send the recording schedule 38 on an hourly, daily, weekly, or other temporal-based measure. The recording schedule 38 may additionally or alternatively be sent whenever a change occurs, such as when a new or different event or media is scheduled for recording and/or for deletion. The recording application 28 may additionally or alternatively only send individual titles or other identifiers of additions or changes to the recording schedule 38. Regardless, the server 22 may be notified of any event or media that is scheduled for recording by the user's electronic device 20 (or by any device networked with the user's electronic device 20).

The reader is assumed to be generally familiar with recording schedules. If, however, the reader desires more information, the reader is invited to consult the following sources: U.S. Pat. No. 6,792,469 to Callahan et al. (Sep. 14, 2004); Published U.S. Patent Application 2002/0144289 to Taguchi et al. (Oct. 3, 2002); Published U.S. Patent Application 2003/0005432 to Ellis et al. (Jan. 2, 2003); Published U.S. Patent Application 2003/0131355 to Berenson et al. (Jul. 10, 2003); Published U.S. Patent Application 2003/0208767 to Williamson et al. (Nov. 6, 2003); Published U.S. Patent Application 2004/0008972 to Haken (Jan. 15, 2004); Published U.S. Patent Application 2004/0013409 to Beach et al. (Jan. 22, 2004); Published U.S. Patent Application 2004/0060063 to Russ et al. (Mar. 25, 2004); Published U.S. Patent Application 2004/0078817 to Horowitz et al. (Apr. 22, 2004); and Published U.S. Patent Application 2005/0229212 to Kuether et al. (Oct. 13, 2005). The reader may also consult U.S. application Ser. No. 11/413,886, filed Apr. 28, 2006.

Figure 2:
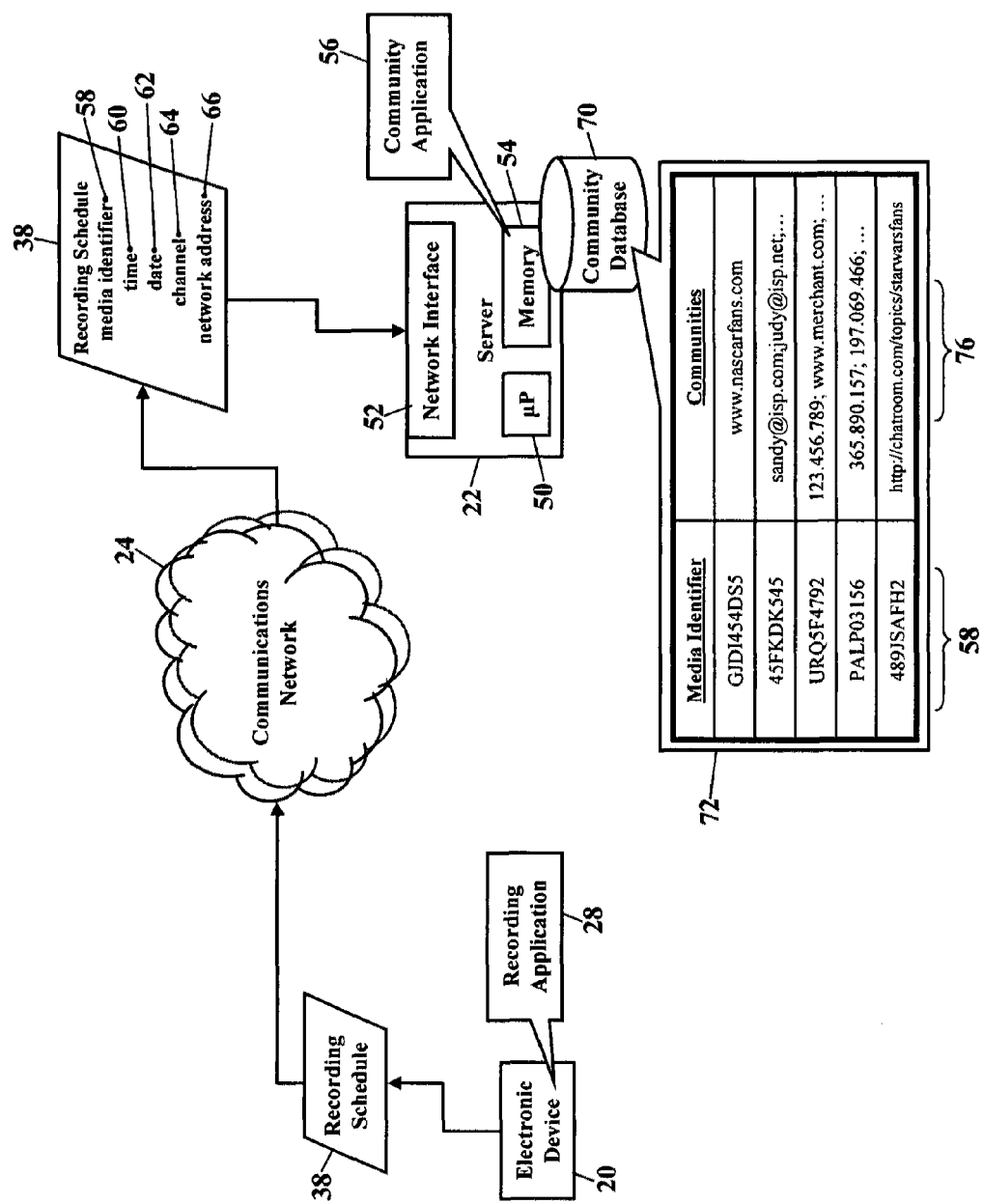

FIG. 2 is a schematic further illustrating the operating environment, according to more exemplary embodiments. Here the server 22 is simply illustrated, with a server processor 50 communicating with a network interface 52 and with server memory 54. A community application 56 is stored in the server memory 54. According to exemplary embodiments, the community application 56 may include processor-executable code or instructions that cause the server processor 50 to analyze the recording schedule 38 and to recommend one or more social communities. As FIG. 2 illustrates, the server processor 50 receives the user's recording schedule 38 via the network interface 52 to the communications network 24. The recording schedule 38 may indicate what media is scheduled for recording by the user's electronic device 20. The recording schedule 38 may identify the media to be recorded, such as by a media identifier 58. The media identifier 58 may be any alphanumeric identification that uniquely identifies the media. While the media identifier 58 may be a title, for example, the media identifier 58 is more likely a code that uniquely identifies the media to be recorded. The recording schedule 38 may also identify a time 60 and/or a date 62 of scheduled recording, a channel 64 on which the programming event may be offered/scheduled, and/or a network address 66 from which the media may be obtained.

The community application 56 may query a community database 70. The community database 70 is illustrated as being locally stored in the server memory 54, yet the community database 70 may be remotely stored and accessed via the communications network 24. The community database 70 associates social communities to media identifiers. FIG. 2, for example, illustrates the community database 70 as a table 72 that maps, relates, or otherwise associates media identifiers 58 to social communities 76. The community application 56 may extract the media identifier 58 from the recording schedule 38. When the recording schedule 38 identifies the time 60 and/or the date 62 of scheduled recording, the channel 64 on which the media may be scheduled, and/or the network address 66 from which the media may be obtained, then the community application 56 may discard one, some, or all of that information from the recording schedule 38. The community application 56 may then query the community database 70 for the media identifier 58 associated with the media to be recorded by the user's electronic device 20.

The community application 56 retrieves a social community. When the community database 70 receives the media identifier 58, the community database 70 looks up or retrieves any social communities 76 that are associated with the media identifier 58. The social communities 76 may be any individuals, clubs, and/or organizations that are related to the media identifier 58. The social communities 76 may include websites, chat rooms, group lists, distribution lists, and/or other electronic communities that are associated with the media identifier 58. Suppose, for example, that the media identifier 58 corresponds to a NASCAR® race. That is, the user's electronic device 20 (or some networked device) is scheduled to record a NASCAR® race. The community database 70 may then retrieve one or more social communities 76 that are related to the media identifier 58 (corresponding to the NASCAR® race). The community database 70, for example, may retrieve one or more chat room addresses that are topically oriented to NASCAR® fans. The community database 70 may retrieve website and server addresses representing fan clubs, enthusiast's sites, ticket agencies, and/or travel agencies. The community database 70 may retrieve website addresses for merchants selling/offering NASCAR®-related clothing, souvenirs, goods, and services. The community database 70 may retrieve any server or destination address having content related to the media identifier 58.

The community database 70 may also retrieve lists of addresses. The community database 70, for example, may associate the media identifier 58 to one or more user groups. Each user group may be one or more communications addresses for users that have expressed an affinity for the media identifier 58. A user group may include members or participants who are merchants, clubs, and/or formal organizations. The community database 70, for example, may retrieve a listing of email, instant messaging, pager, website, or any other communications addresses for users belonging to some NASCAR®-oriented community. The community database 70 may retrieve a listing of communications addresses for individual users who wish to converse/communicate about NASCAR®. Again, the listing of communications addresses may include email and/or instant messaging addresses for individual users, yet the listing may also include telephone numbers and/or physical addresses. The community database 70 may retrieve any user name, address, club, or organization having an affinity with the media identifier 58.

The media identifier 58 and the community database 70 may be expanded. The media identifier 58 may additionally or alternatively include any information related to media. The media identifier 58, for example, may include a name of an actor ("Harrison Ford") or actress ("Betty Grable"). The media identifier 58 may describe a genre ("educational," "science," "romance," or "action"). The media identifier 58 may describe a theme (e.g., "racing," "antiques," "horses," or "gardening"), setting ("hospital" or "restaurant"), location ("New York" or "Paris"), or scene ("harbor" or "farm"). The media identifier 58 may describe a producer, director, animator, or other person/entity (e.g., PIXAR®) involved in the media production. The media identifier 58 may describe one or more characters, such as LUKE SKYWALKER® or JAMES BOND®. The media identifier 58 may even describe names, phone numbers, websites, physical addresses, or any other information. The media identifier 58, in general, may describe any term(s) or subject(s). The community database 70, then, may be expanded to associate these terms and/or subjects to social communities. The community database 70 may store any social community having an affinity for any term or subject matter. When a social community registers for inclusion in the community database 70, the community may list or include any number of terms for which an affinity is desired.

Figure 3:
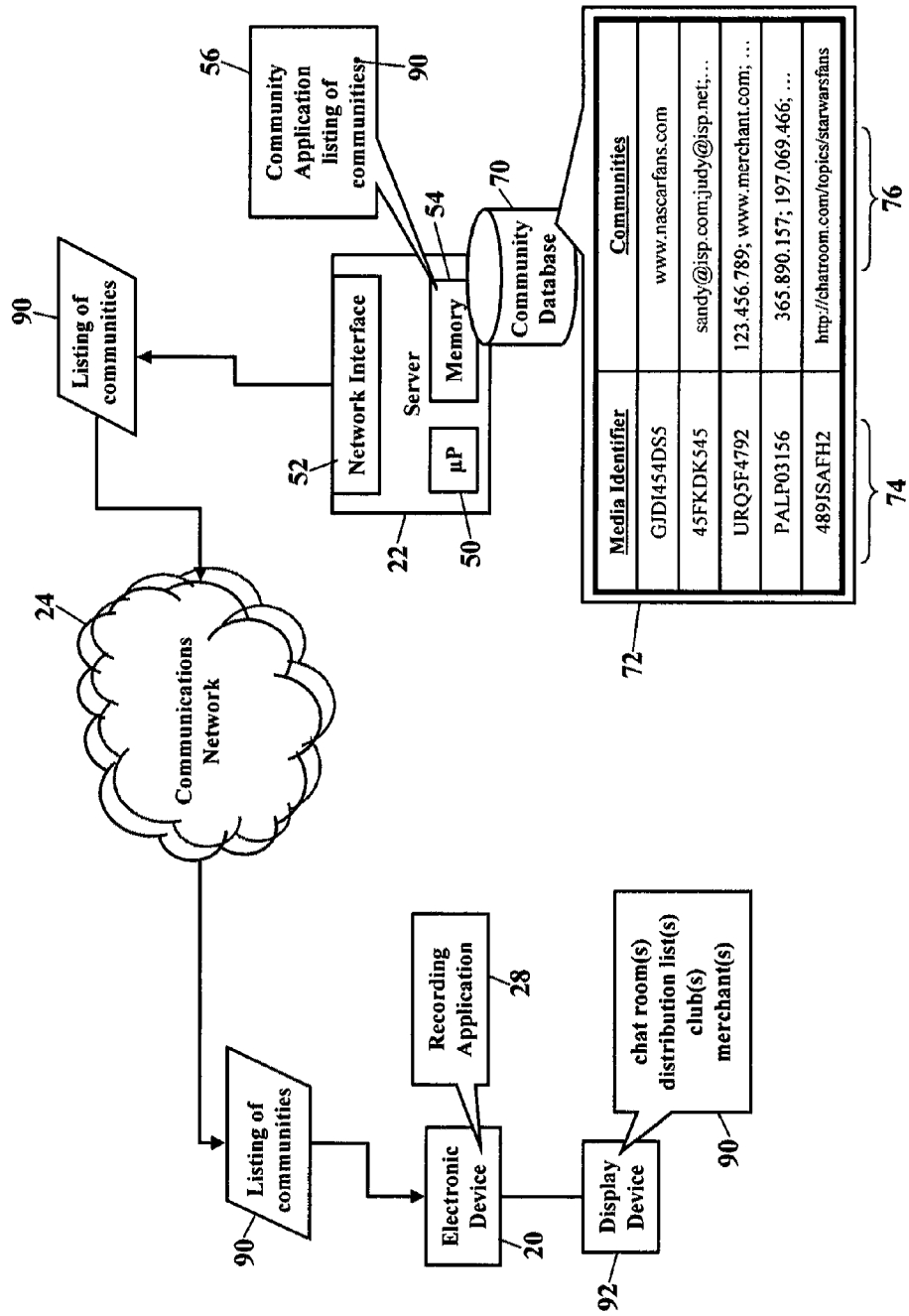

FIG. 3 is a schematic further illustrating the operating environment, according to exemplary embodiments. Whatever the media identifier 58, the community application 56 may retrieve one or more social communities 76 that are associated with the media identifier 58. The community application 56 may instruct the server processor 50 to send a listing 90 of communities. The listing 90 of communities may comprise the query results from the community database 70. The listing 90 of communities may comprise information describing users, addresses, club names, and/or organizations having any affinity with the media identifier 58. The listing 90 of communities may comprise information describing chat rooms, user groups, IM communities, or individual users having an affinity with the media identifier 58. FIG. 3, for simplicity, illustrates the listing 90 of communities being communicated to the user's electronic device 20. The listing 90 of communities, however, may be sent to any physical or electronic address associated with the user.

The user receives the listing 90 of communities. The user's electronic device 20 may visually and/or audibly present the listing 90 of communities (such as on a display device 92). The user is thus informed of others who share some similar affinity for the same media identifier 58. The user may then contact any member, user, or address in the listing 90 of communities and share similar interests and/or experiences.

Some aspects of social communities are known, so this disclosure will not discuss the known aspects. If, however, the reader desires more information, the reader is invited to consult the following sources: U.S. Pat. No. 6,519,771 to Zenith; Published U.S. Patent Application 2003/0078972 to Tapissier, et al.; Published U.S. Patent Application 2004/0111467 to Willis; Published U.S. Patent Application 2004/0117831 to Ellis, et al.; Published U.S. Patent Application 2005/0071884 to Champel, et al.; Published U.S. Patent Application 2005/0132401 to Boccon-Gibod, et al.; Published U.S. Patent Application 2005/0149987 to Boccon-Gibod, et al.; Published U.S. Patent Application 2006/0123080 to Baudino, et al.; Published U.S. Patent Application 2006/0271961 to Jacoby, et al.; and Published U.S. Patent Application 2006/0282851 to Errico, et al.

The server 22 is only simply illustrated. Because the architecture and operating principles of the server 22 are well known, its hardware and software components are not further shown and described. If the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 4:
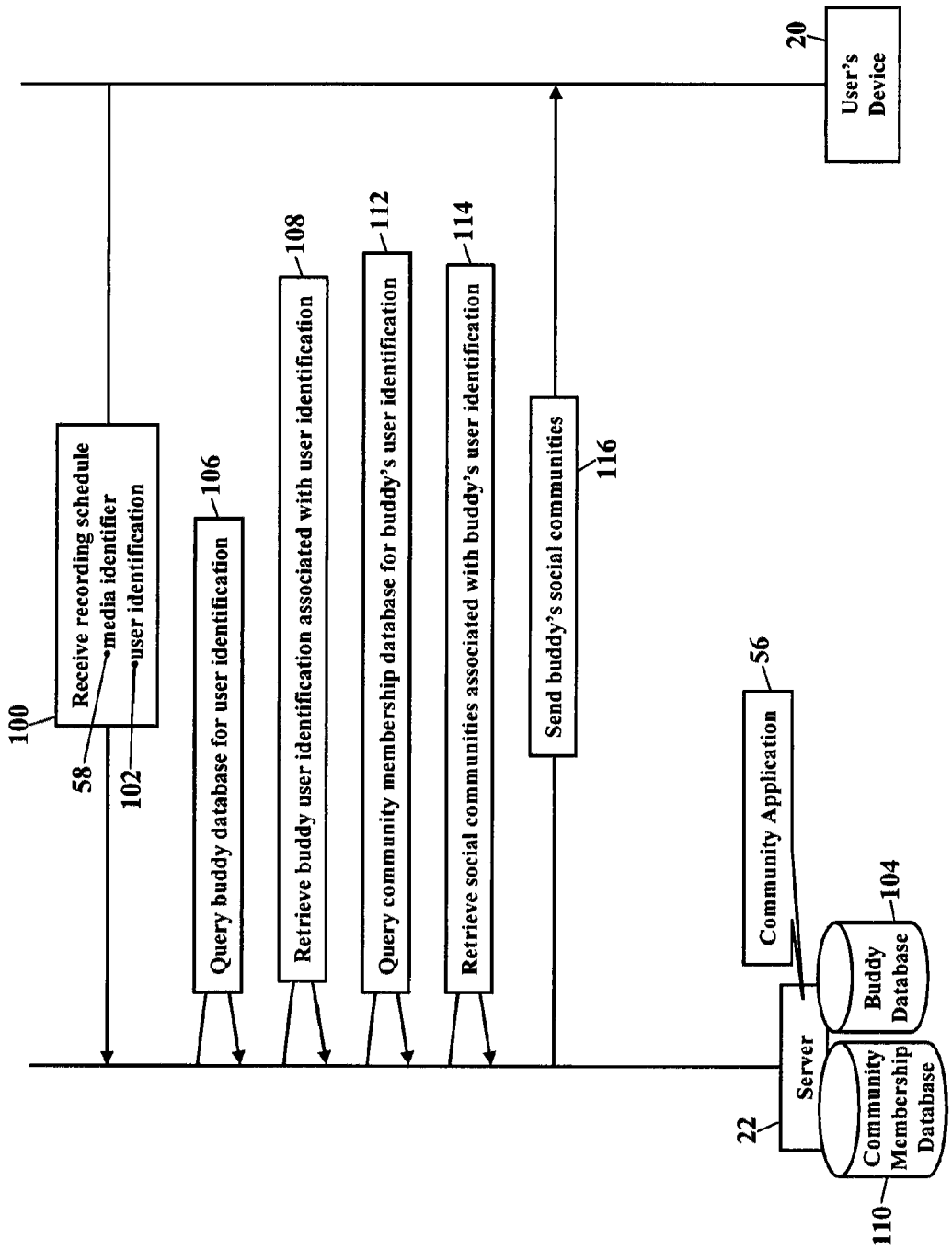
FIG. 4 is a schematic illustrating a process for recommending social communities, according to more exemplary embodiments.

FIG. 4 is a schematic illustrating a process for recommending social communities, according to more exemplary embodiments. Here exemplary embodiments share communities amongst buddies. That is, when a "buddy" is a member of a social community, exemplary embodiments may inform other "buddies" of those same communities. A "buddy" designation between users may indicate similar interests, so buddies may be recommended the same social communities.

As FIG. 4 illustrates, the server 22 receives the user's recording schedule 38 (Block 100). The recording schedule 38 may include the media identifier 58, and the recording schedule 38 may include a user identification 102. The user identification 102 may be a username, password, or other alphanumeric identifier that uniquely identifies the user associated with the recording schedule 38. The community application 56 may query a buddy database 104 for the user identification 102 (Block 106). The buddy database 104 is illustrated as being locally stored in the server 22, yet the buddy database 104 may be remotely stored and accessed via the communications network (illustrated as reference numeral 24 in FIGS. 1-3). The buddy database 104 may also cooperate with, or be incorporated into, the community database (illustrated as reference numeral 70 in FIGS. 2 and 3). The buddy database 104 may associate user identifications to buddies and/or buddy lists. The buddy database 104, in other words, helps determine a user's buddies. The buddy database 104 responds by returning/sending one or more buddy user identifications that are associated with the user identification 102. The community application 56 retrieves the buddy user identifications associated with the user identification 102 (Block 108).

The community application 56 may then query a community membership database 110 (Block 112). The community membership database 110 maps, relates, or otherwise associates user identifications to membership listings of social communities. The community membership database 110 is illustrated as being locally stored in the server 22, yet the community membership database 110 may be remotely stored and accessed via the communications network 24. The community membership database 110 may also cooperate with, or be incorporated into, the community database (illustrated as reference numeral 70 in FIGS. 2 and 3). The community application 56 queries the community membership database 110 for the buddy user identifications. The community membership database 110, in other words, tracks what users (e.g., user identifications) are associated with social communities. Suppose, for example, that a buddy belongs to a "home repair" community. When the "home repair" community is registered in the community membership database 110, then the community membership database 110 may store or access a membership listing for the "home repair" community. The community membership database 110 responds to queries by providing names of social communities for which the buddy belongs. The community application 56 may then retrieve the names of social communities associated with the buddy's user identification (Block 114).

The user may then receive the names of the buddy's social communities. The community application 56 may send the names of the buddy's social communities (Block 116). The user's electronic device 20 may visually and/or audibly present the names (such as on the display device 92 illustrated in FIG. 3). The community application 56 may send a notification informing the user of the buddy's communities (e.g., "Your buddy 'johnsmith' is a member of the 'home repair' community."). The user is thus informed of the buddy's social communities. Here, then, the community application 56 may assume that "buddies" share a similar affinity for social communities. When a user's buddy belongs to a social community, then the community application 56 may recommend that same community to the user.

Figure 5:
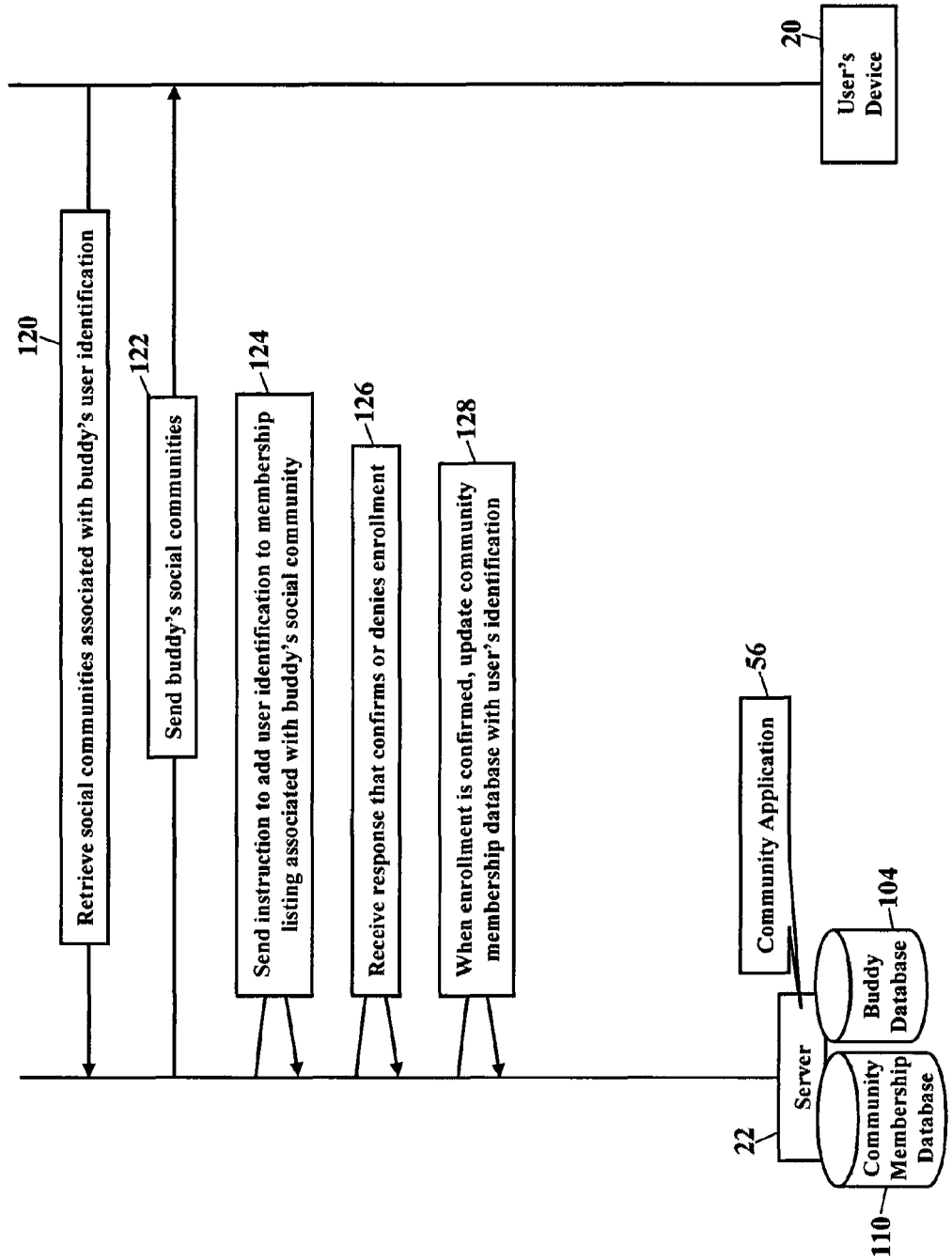
FIG. 5 is a schematic illustrating another process for recommending social communities, according to even more exemplary embodiments.

FIG. 5 is a schematic illustrating another process for recommending social communities, according to even more exemplary embodiments. Here exemplary embodiments may automatically enroll the user in the buddy's social communities. The community application 56 retrieves the addresses and/or names of social communities associated with the buddy's user identification (Block 120). The community application 56 may send those social communities to the user's electronic device 20 (Block 122). Here, though, the community application 56 may also automatically enroll the user in one or more of the buddy's communities. The community application 56 acts on behalf of the user to enroll the user in the one or more of the buddy's social communities. The community application 56 may be configured to assume that one, some, or all "buddies" share a similar affinity for social communities. As FIG. 5 illustrates, the community application 56 may send an instruction to add the user identification to a membership listing associated with the buddy's social community (Block 124). The community application 56 may send the instruction to a server, application, or other network address that stores, maintains, or manages the membership listing. The community application 56, for example, may send the instruction to a server address that stores a membership listing for the "home repair" community. The instruction may include any information needed for enrollment, such as a username and/or password associated with the user. The community application 56 may receive a response that confirms or denies enrollment (Block 126). When enrollment is confirmed, the community application 56 may update the community membership database 110 with the user's identification (Block 128). The community application 56 thus helps maintain accurate membership listings of social communities.

Figure 6:
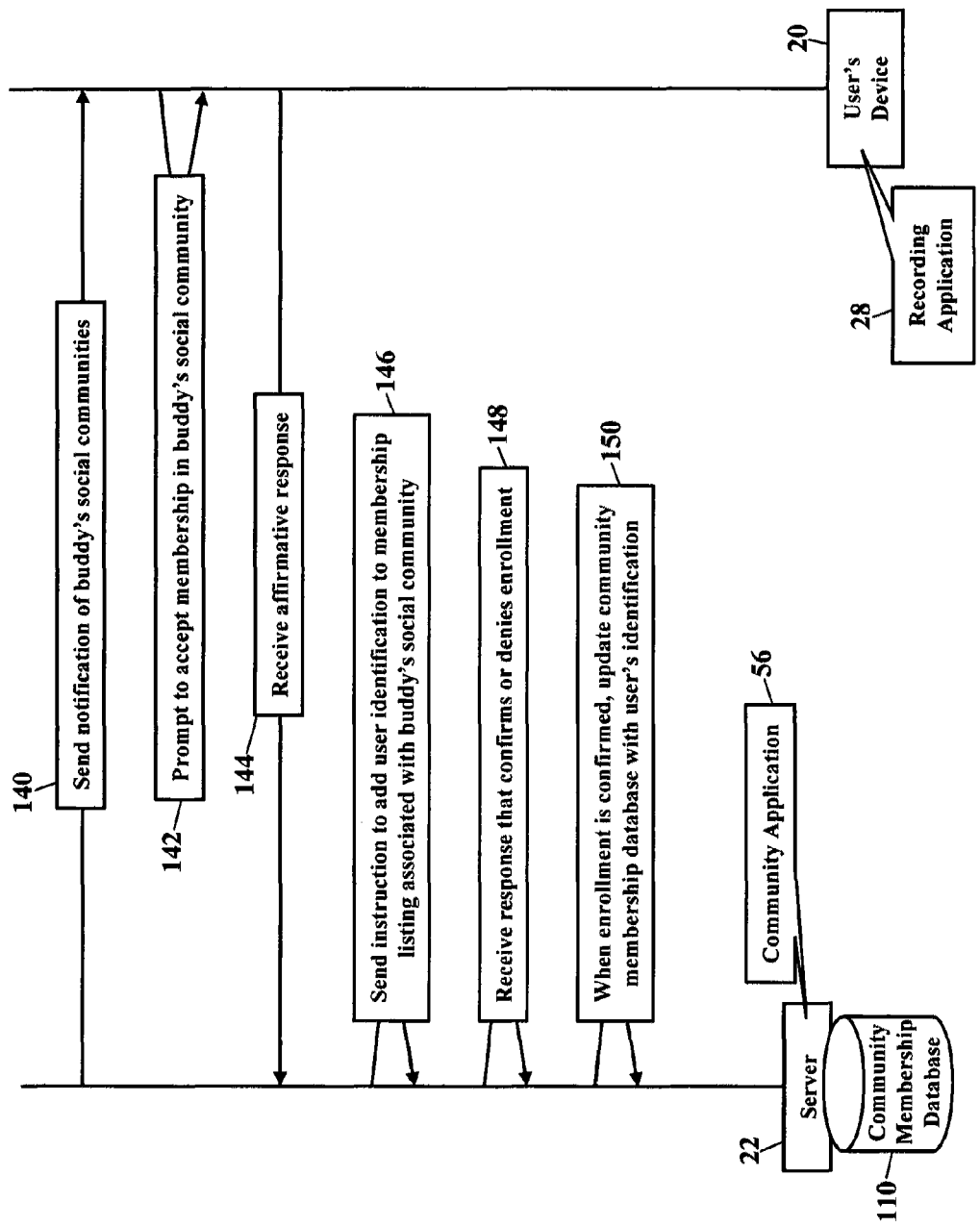
FIGS. 6 and 7 are schematics further illustrating a process for recommending social communities, according to even more exemplary embodiments.
Figure 7:
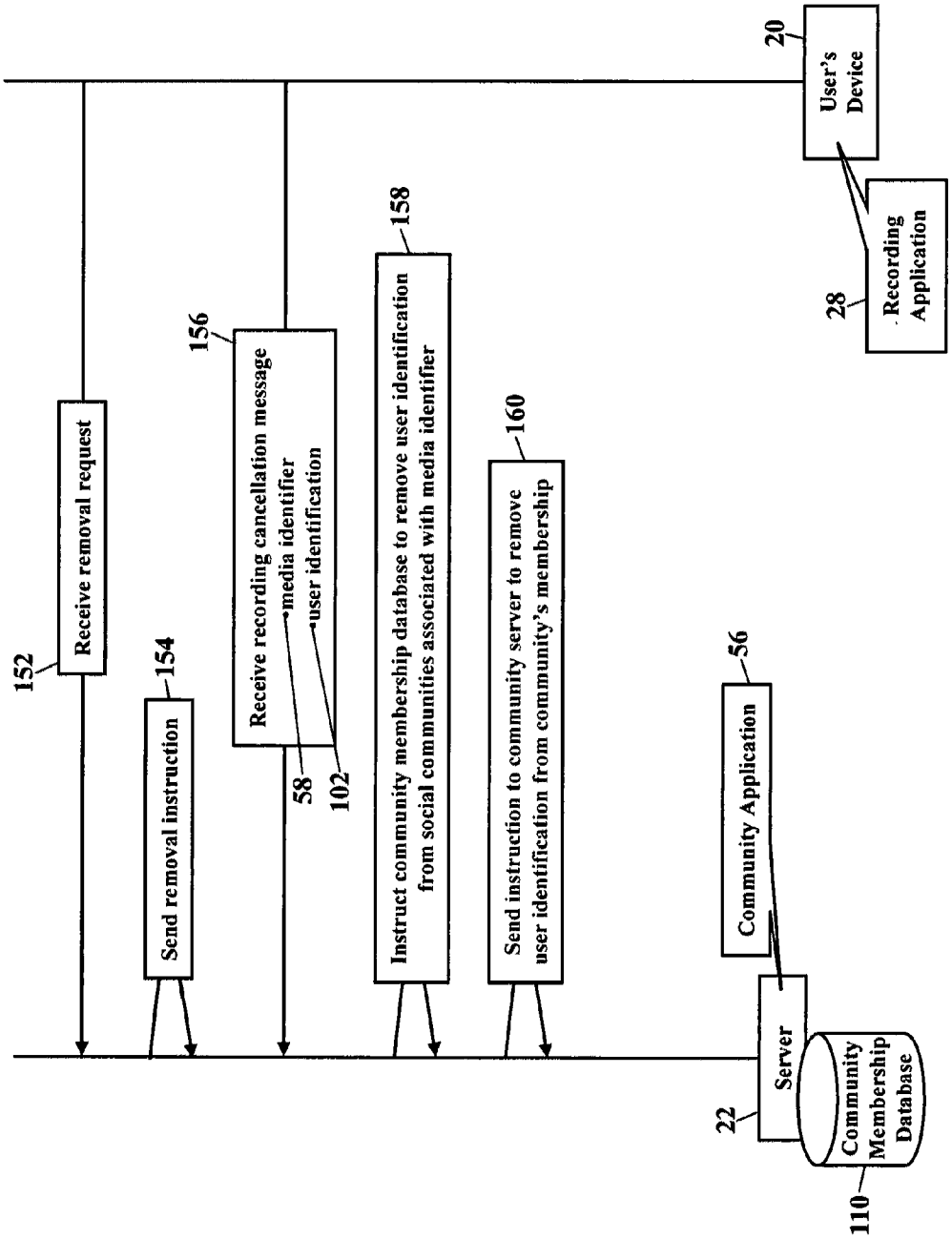

FIGS. 6 and 7 are schematics further illustrating a process for recommending social communities, according to even more exemplary embodiments. Here exemplary embodiments may remove users from social communities. As FIG. 6 illustrates, the community application 56 may send a notification of the buddy's social communities (Block 140). The notification may include or list one or more names of the buddy's social communities. The notification may cause the recording application 28 to prompt the user to accept membership in one or more of the buddy's social communities (e.g., "Would you like to be enrolled in the 'home repair' community?") (Block 142). When the user affirmatively responds (Block 144), the community application 56 may send the instruction to the network address that stores, maintains, or manages the corresponding membership listing (Block 146). (Should the user negatively respond, then no instruction may be sent.) When the community application 56 receives an enrollment confirmation (Block 148), the community application 56 may update the community membership database 110 with the user's identification (Block 150).

The process continues with FIG. 7. Sometimes, however, a user may be automatically removed from a social community. At any time, for example, the user may request for removal from a community. The community application 56 may receive a removal request (Block 152). The community application 56 may then send a removal instruction to the network address that stores, maintains, or manages the corresponding membership listing (Block 154). The removal instruction causes removal or deletion of a user identification from a community's membership roster or listing.

The recording schedule may also cause automatic removed from a social community. As the above paragraphs explained, the community application 56 may recommend, and perhaps enroll the user in, social communities. Sometimes, however, the user may no longer desire to record an event or media. Perhaps the user is no longer interested in the media. Perhaps the user learns that the programming event contains objectionable material. Whatever the reason, the user may delete an entry from the recording schedule 38. When the user deletes an entry from the recording schedule, the recording application 28 may send a recording cancellation message. When the server 22 receives the recording cancellation message (Block 156), the recording cancellation message may identify the user identification 102 and the media identifier 58 that has been removed from the user's recording schedule. Because the user has deleted this media identifier 58 from the recording schedule 38, the community application 56 may remove the user from social communities associated with the media identifier 58. The community application 56, for example, may instruct (or send an instruction to) the community membership database 110 (Block 158). The instruction may include the user identification 102 and the media identifier 58. The instruction causes the community membership database 110 to remove the user identification 102 from any social communities associated with the media identifier 58. The community application 56 may additionally or alternatively send an instruction to the network address that stores, maintains, or manages the community's corresponding membership listing (Block 160). The instruction causes removal or deletion of the user identification 102 from the community's membership roster or listing. Here, then, deletion of an entry from the recording schedule may trigger removal of membership in a community.

Figure 8:
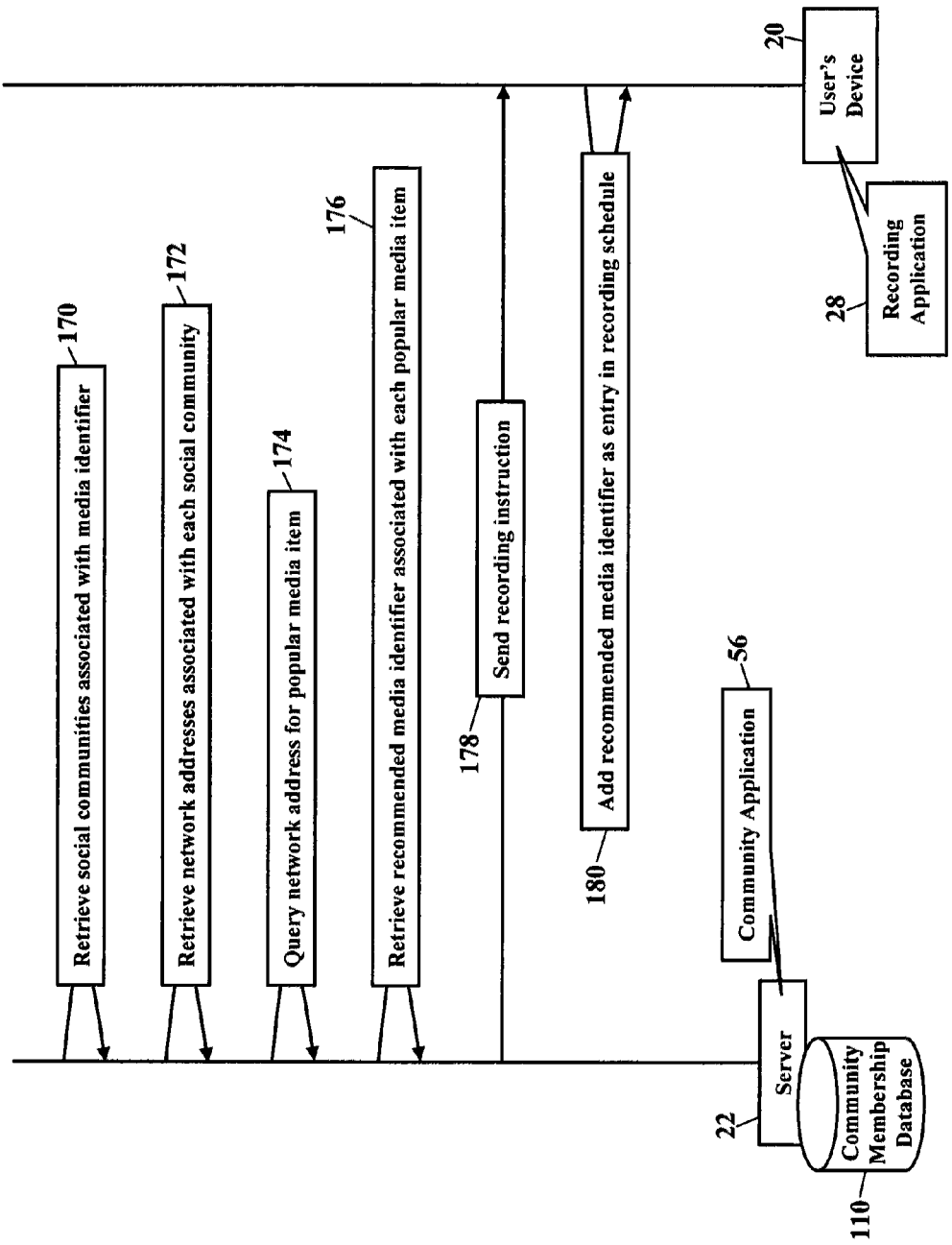
FIG. 8 is a schematic further illustrating yet another process for recommending social communities, according to still more exemplary embodiments.

FIG. 8 is a schematic further illustrating yet another process for recommending social communities, according to still more exemplary embodiments. Here the user's recording schedule 38 may be automatically updated to schedule recording of programming and other media items. When the community application 56 receives the user's recording schedule 38, the community application 56 retrieves the social communities associated with the media identifier 58 (Block 170). The community application 56 may also retrieve network addresses associated with each social community (Block 172). The community application 56 may then query a network address for one or more popular media items (Block 174). Each popular media item may be some program, movie, picture, website, chat room, or any other media that is popularly recommended by the social community. Members of the social community may vote or rank media that is of interest to the members. Members of the social community may develop a recommendation list of media that is of interest to the members. However the popular media items are determined, the community application 56 may query for those media items that are popularly recommended by the community. The community application 56 retrieves a recommended media identifier associated with each popular media item (Block 176). The community application 56 may then send a recording instruction to the user's electronic device 20 (Block 178). The recording instruction includes the recommended media identifier that corresponds to the popular media item recommended by the community. The recording instruction causes the recording application 28 to create a new entry in the user's recording schedule 38 (Block 180). The recording instruction may include a time, channel, and/or network address associated with the recommended media identifier. The recording application 28 thus adds the recommended media identifier to the recording schedule 38. The recording application 28 may initiate a search for programming details associated with the recommended media identifier. The recording application 28, for example, may search a program listing or electronic program guide for the recommended media identifier. The recording application 28 may query a database server (such as a YAHOO® or GOOGLE® server) for programming details (e.g., channel, date, and/or time of broadcast or a content server address). However the details are obtained, the user's recording schedule 38 may be updated to record content recommended by a social community.

Figure 9:
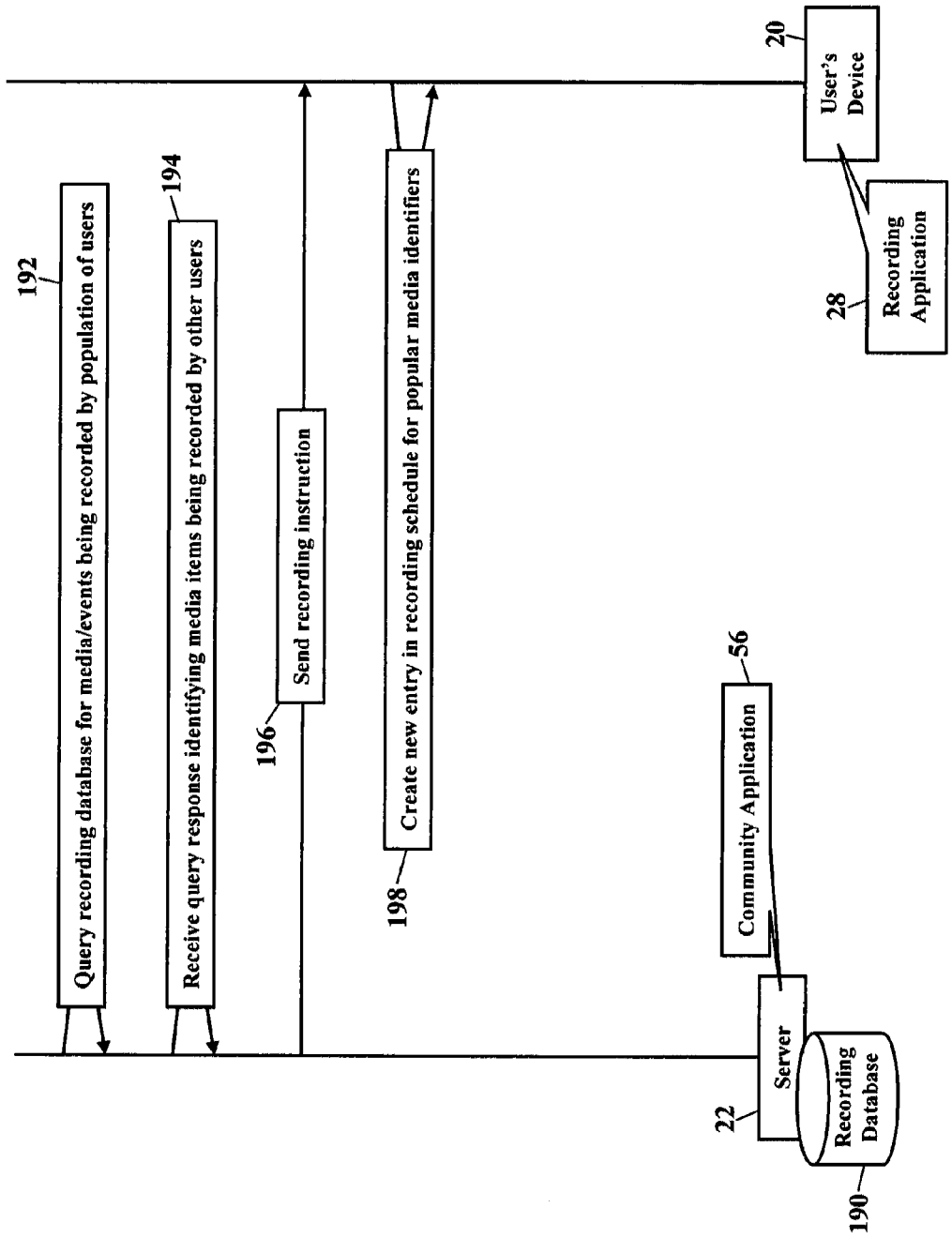
FIG. 9 is a schematic further illustrating another process for recommending social communities, according to yet more exemplary embodiments.

FIG. 9 is a schematic further illustrating another process for recommending social communities, according to yet more exemplary embodiments. Here again the user's recording schedule 38 may be automatically updated to schedule recording of programming and other media items. When the community application 56 receives the user's recording schedule 38, the community application 56 may query a recording database 190 (Block 192). The recording database 190 is illustrated as being locally stored in the server memory 54, yet the recording database 190 may be remotely stored and accessed via the communications network 24. The recording database 190 may also cooperate with, or be incorporated into, the community database (illustrated as reference numeral 70 in FIGS. 2 and 3). The recording database 190 tallies how many users are recording a particular media item. The recording database 190 thus tracks and/or ranks the most popular media and/or programming events that are being recorded by a population of users. The recording database 190, for example, may be affiliated with a social community, such that the user's affinity for that social community helps ensure the popularly-recorded media may be of interest to the user. The recording database 190, however, may tally the recording habits of a neighborhood, city, county, state, or other regional/geographic population. The recording database 190 may tally users' recording habits by sex (male and female users), by age (e.g., children, teens, adults, senior citizens), income, or by any other demographic.

The community application 56 receives a response to the query (Block 194). The recording database 190 responds with one or more popular media identifiers 58 that correspond to popular media items that are being recorded by other users. The community application 56 may then send a recording instruction to the user's electronic device 20 (Block 196). The recording instruction may include the popular media identifiers 58 and causes the recording application 28 to create one or more new entries in the user's recording schedule 38 (Block 198). The recording instruction may include a time, channel, and/or network address associated with the popular media identifiers 58. The recording application 28 thus adds the popular media identifiers 58 to the recording schedule 38. The recording application 28, if needed, may initiate a search for programming details associated with the popular media identifiers 58 (as explained with reference to FIG. 8). However the details are obtained, the user's recording schedule is updated to record popular content.

Figure 10:
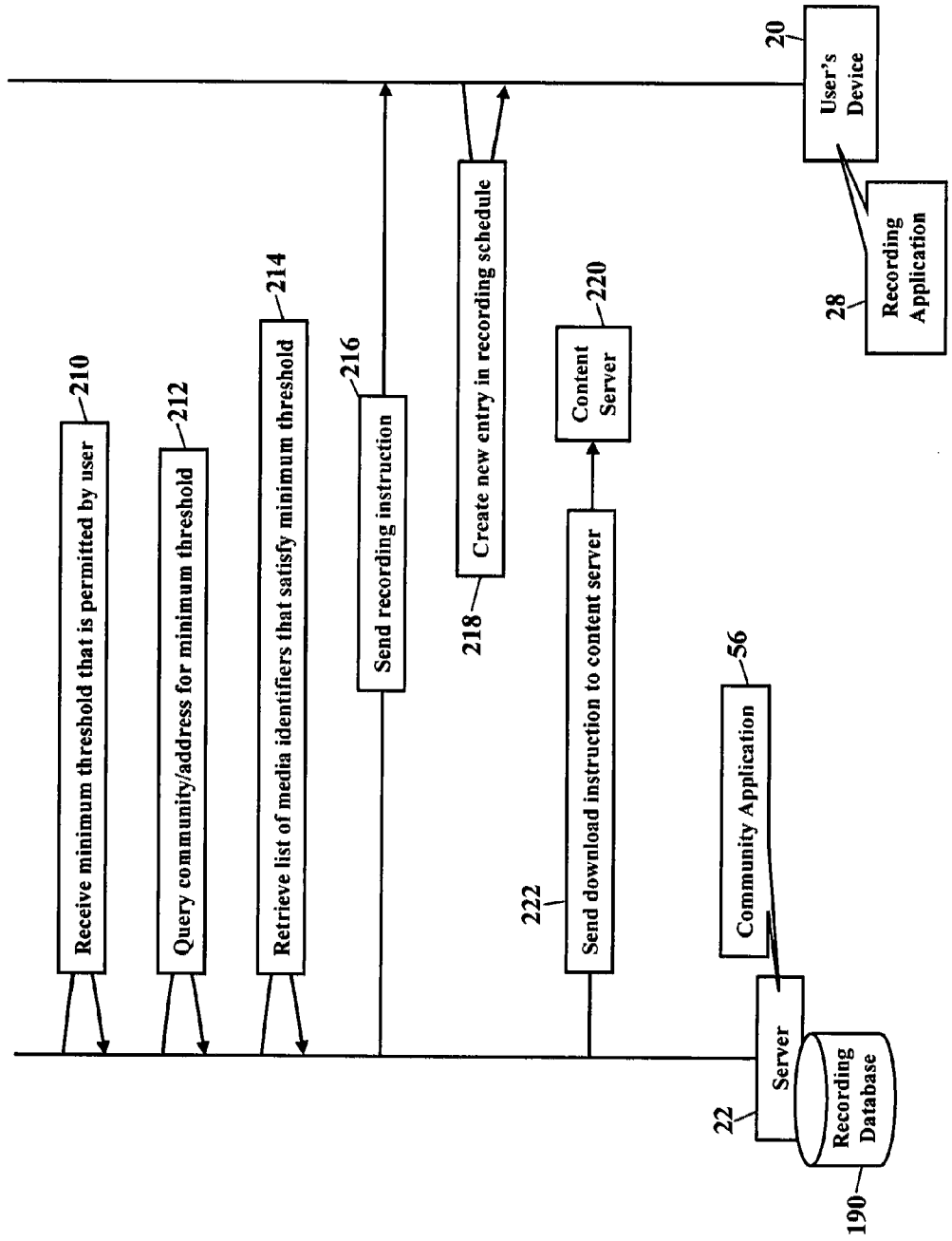
FIG. 10 is a schematic further illustrating yet another process for recommending social communities, according to still more exemplary embodiments.

FIG. 10 is a schematic further illustrating yet another process for recommending social communities, according to more exemplary embodiments. Here social communities may recommend media according to ratings or other evaluations. When the user enrolls in a social community, exemplary embodiments may permit that user to establish minimum ratings for recommendations. That is, the user may establish a profile that limits what media content may be recommended by other users. As FIG. 9 illustrates, the community application 56 may receive a minimum threshold that is permitted by a user (Block 210). The user, for example, may only desire recommended media having a three-star (*) or four-star (**) rating. The user may only be interested in media that has a "top 5" ranking. However a community or population of users recommends media, the user may only wish to be informed of media that satisfies the minimum threshold rating or ranking. The community application 56 may then query a community or other network address for the minimum threshold (Block 212). The community application 56 may thus retrieve a list of media identifiers 58 that satisfy the minimum threshold (Block 214). The community application 56 may then send a recording instruction to the user's electronic device 20 (Block 216). The recording instruction may include the list of media identifiers 58 that satisfy the minimum threshold. The recording instruction causes the recording application 28 to create a new entry in the user's recording schedule 38 for each media identifier 58 (Block 218). The user's recording schedule is thus updated to record content that satisfies the minimum threshold.

Exemplary embodiments may even pre-populate media to the user's electronic device 20. When the community application 56 determines or receives media content that may appeal to a user, the community application 56 may cause that media content to be downloaded to the user's electronic device 20 (or some other destination networked with, associated with, or specified by the user). Continuing with FIG. 10, for example, the community application 56 may send a download instruction to a content server 220 (Block 222). The download instruction, for example, may include some (or all) of the list of media identifiers that satisfy the minimum threshold. The download instruction, however, may include any media identifier that may appeal, or has an affinity with, the user. The download instruction may instruct the content server to send or download content, associated with the selected media identifier, to the user's electronic device 20. Here, then, the community application 56 may pre-populate the user's electronic device 20 with programming and/or media that appeals to the user. The community application 56 may thus create a selection of content for the user's immediate enjoyment.

Figure 11:
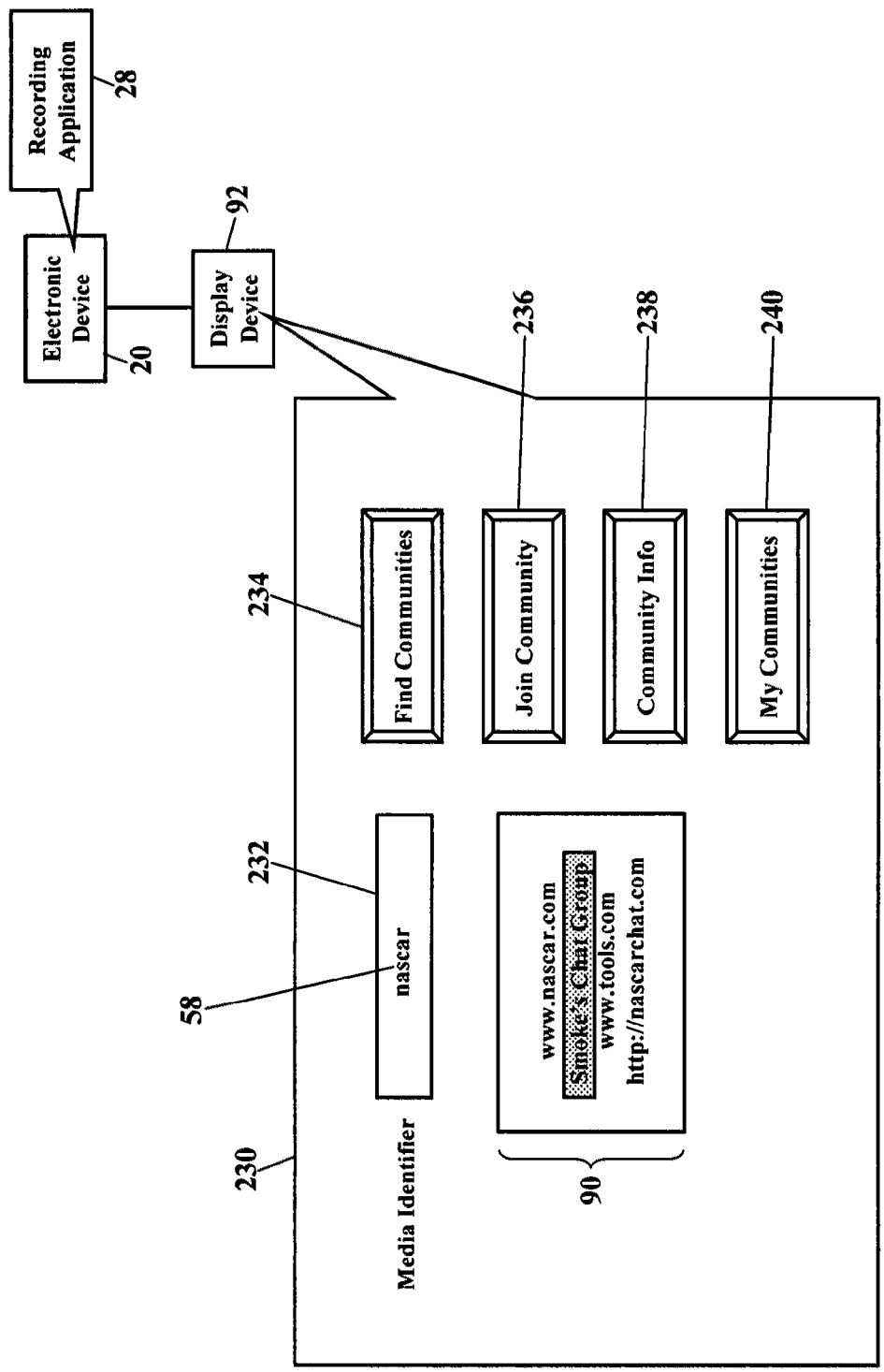
FIGS. 11 and 12 are schematics illustrating a graphical user interface 230 for recommending social communities, according to more exemplary embodiments.
Figure 12:
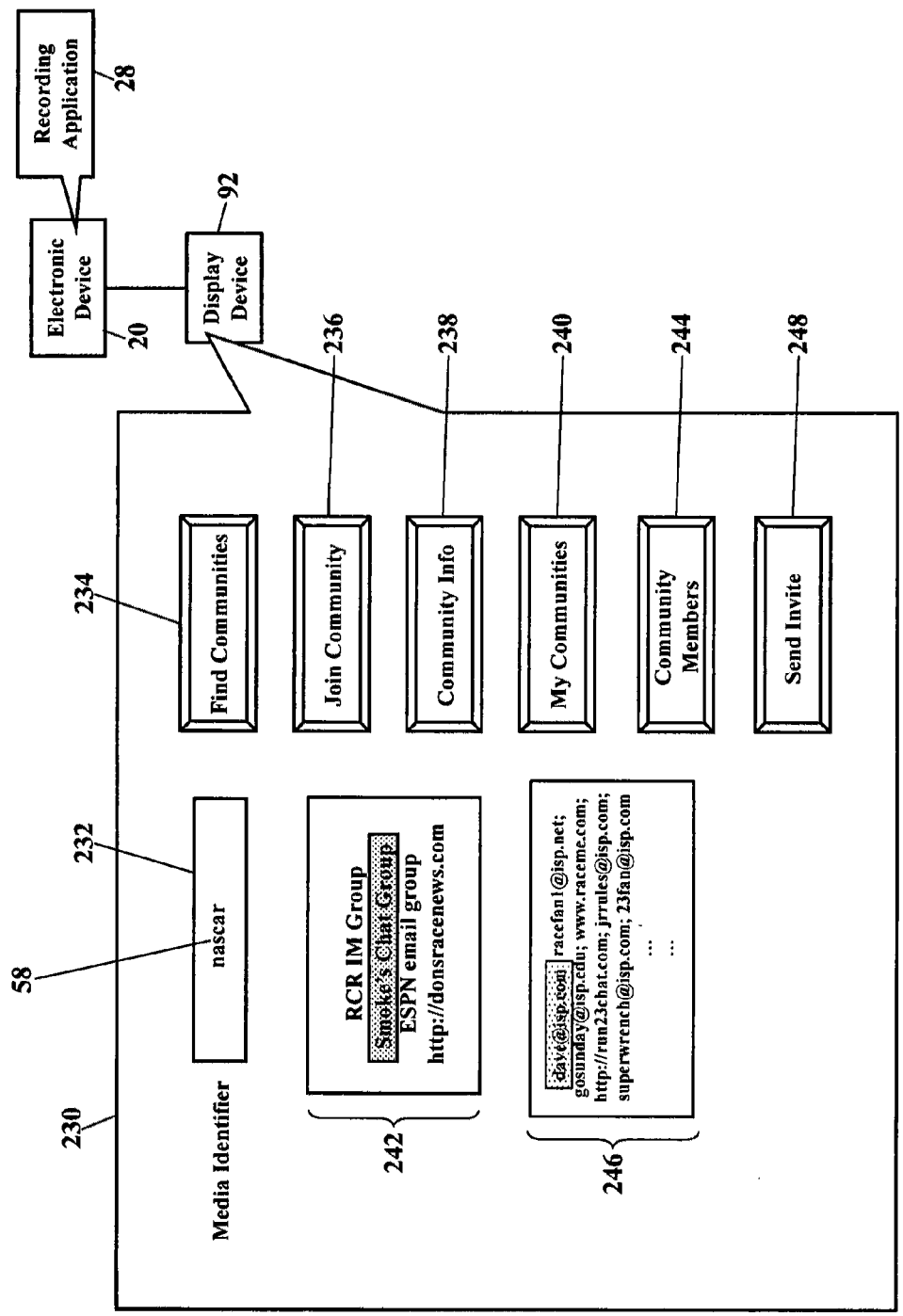

FIGS. 11 and 12 are schematics illustrating a graphical user interface 230 for recommending social communities, according to more exemplary embodiments. The graphical user interface 230 is illustrated as being processed and visually produced by the recording application 28 on the display device 92, yet the graphical user interface 230 may have audible componentry or accompaniments. The graphical user interface 230 has a data field 232 into which the user enters the media identifier 58. The media identifier 58, as earlier explained, may describe any term(s) or subject(s) which interest the user. Once the user enters the desired media identifier 58 (such as by typing "nascar" in the data field 232), the user submits the media identifier 58 to the community application 56 operating in the server 22. (The user, for example, may select a "Find Communities" control button 234.) The media identifier 58 is sent to the community application 56 (via the communications network 24 shown in FIGS. 1-3), and the community application 56 queries the community database 70. The community application 56 then returns the listing 90 of communities that have an affinity or association with the media identifier 58. The recording application 28 then presents the listing 90 of communities in the graphical user interface 230. When one or more social communities interest the user, the user may highlight those communities and, for example, select a "Join Community" control button 236. The user is then enrolled in the selected communities, as earlier paragraphs explained. Should the user desire more information on a particular community, the user may highlight or otherwise indicate that community and, for example, select a "Community Info" control button 238. The recording application 28 may then cooperate with the community application 56 to obtain information about the selected community. The recording application 28 and/or the community application 56, for example, may query an address associate with that community to obtain community information.

The user may be presented with other options for joining communities. Some digital recorders, for example, offer a "Season Pass" or "Wish List" recording feature. Exemplary embodiments may be incorporated into the "Season Pass" or "Wish List" recording features. Should a user select either feature, the user may be offered an opportunity to join a community associated with the programming event. When, for example, the user schedules recording of "Alias" or "Lost," the user may join communities associated with either program. If the user wishes to record any program or media in which "Alicia Witt" is acting, exemplary embodiments may offer the user an opportunity to join a community associated with "Alicia Witt." If no community exists, then the user may be offered an opportunity to create a new community in the community database 70. When, for example, a response from the community database 70 indicates that no community is associated with the media identifier 58, then exemplary embodiments may prompt the user create a new social community associated with the media identifier 58. The graphical user interface 230 may have a "Create Community" control button (not shown for simplicity) that, when selected, allows the user to establish a new community in the community database 70. The community database 70 creates a new entry that associates the user to the media identifier 58. The user may also associate names and/or addresses of other sponsors and users that might be interested in the new community. Exemplary embodiments may automatically send an invitation to each potential sponsor and member.

The user may select a "My Communities" control button 240. When the user selects the "My Communities" control button 240, the user is presented with a listing of communities for which the user is a member. The recording application 28 may then cooperate with the community application 56 to query the community membership database 110. Recall that the community membership database 110 associates user identifications to social communities. The recording application 28 and/or the community application 56 query the community membership database 110 for the user identification. The community membership database 110 responds with a listing of social communities having the user identification as a member.

FIG. 12 further illustrates the graphical user interface 230. Here the graphical user interface 230 displays a listing 242 of social communities for which the user is a member. When the user desires to see a listing of the members of a particular community, the user may highlight the desired community and, for example, select a "Community Members" control button 244. The recording application 28 and/or the community application 56 may query the community membership database 110 for all user identifications associated with the selected community. The community membership database 110 responds with a listing of user identifications. The recording application 28 may then cause presentation of a member listing 246 for the community. When the recording application 28, the community application 56, and/or the community membership database 110 is appropriately configured, the member listing 246 may even include presence information for each member. The user may thus know what members are reachable (e.g., online/offline) and even how an individual member may be reached (instant message, email, cell phone).

The user may send invites. The user may highlight one or members and select a "Send Invite" control button 248. The recording application 28, the community application 56, and/or the community membership database 110 may then cooperate to invite the selected member(s) to join the community. The invite may be of any communications method (such as email, instant message, telephone call, or voicemail). Exemplary embodiments may even automatically alert a community member of actions or events in the community, such as scheduled or spontaneous chat sessions, new web log entries, new members, or the presence of particular members. Exemplary embodiments may even query a community server for current events or actions, such as what topics are currently being discussed or chatted. Exemplary embodiments may even permit video/voice conferences between members of a community.

Users may establish rules. Exemplary embodiments may permit users to establish rules for joining communities, for automatic actions on behalf of the user (such as automatic enrollment), for recording of media, and/or for communicating with members of communities. Some users, for example, may not want to accept messages (e.g., emails, chat messages, or calls) while recording or watching media. "Do Not Disturb" rules may prevent or hinder communications from some members. Auto-replies may be established when rules are enacted.

Some exemplary embodiments may provide other listings. The user, for example, may be provided a listing of buddies, each buddy's presence, and even what media that buddy is receiving/watching. The user may view members, and even non-members, who are watching a particular media or program (such as "CSI"). Exemplary embodiments may indicate in what communities a particular user is enrolled, if that particular member permits revealing this information.

Some exemplary embodiments may permit sorting. Members and/or communities may be sorted or arranged according to priority. A user determines what members, and/or what communities, have higher priority. Any listings or groupings, then, may be sorted arranged according to this priority. Users and/or buddies may even be sorted or arranged based on common attributes. When, for example, two users have similar affinities for the same media or communities, either of those users may establish a priority for users having more or less affinity.

Figure 13:
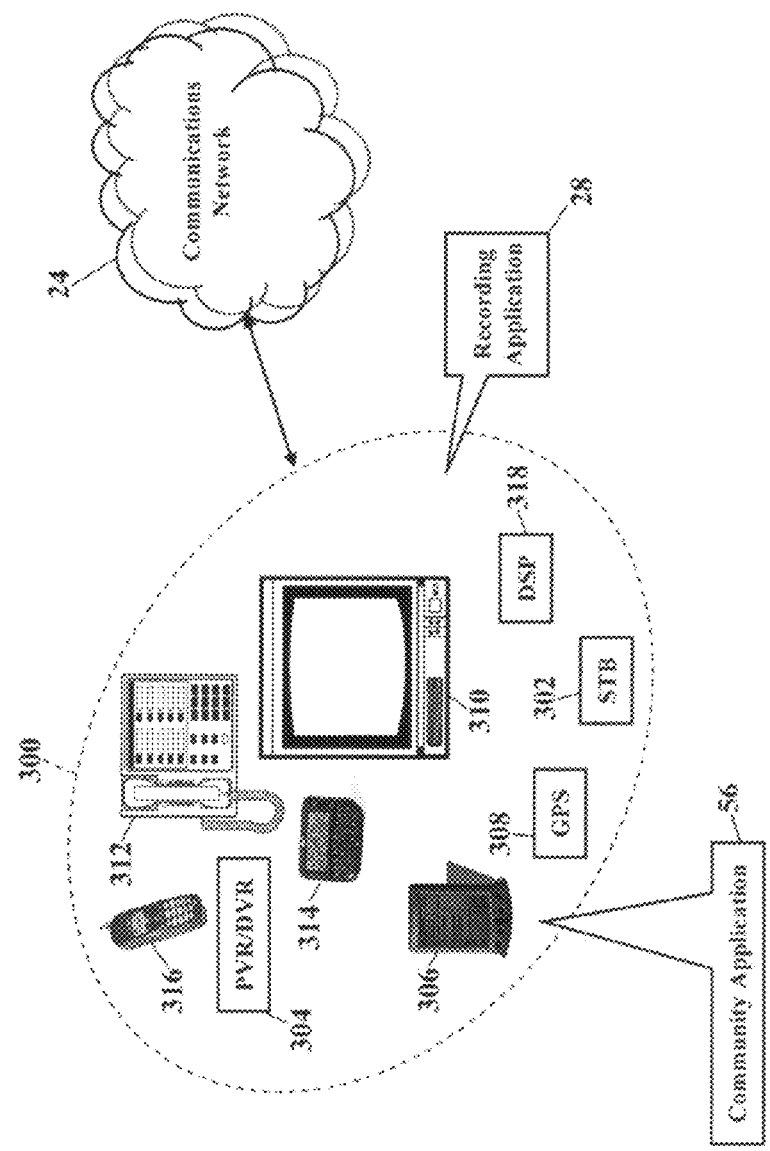
FIG. 13 depicts other possible operating environments for additional aspects of the exemplary embodiments.

FIG. 13 depicts other possible operating environments for additional aspects of the exemplary embodiments. FIG. 13 illustrates that the recording application 28 and/or the community application 56 may alternatively or additionally operate within various other devices 300. FIG. 13, for example, illustrates that the recording application 28 and/or the community application 56 may entirely or partially operate within a set-top box 302, a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system and/or communications device utilizing a digital signal processor (DSP) 318. The device 300 may also include watches, radios, vehicle electronics, clocks, printers, gateways, and other apparatuses and systems. Because the architecture and operating principles of the various devices 300 are well known, the hardware and software componentry of the various devices 300 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); EDWARD M. SCHWALB, iTV HANDBOOK: TECHNOLOGIES AND STANDARDS (2004); ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Figure 14:
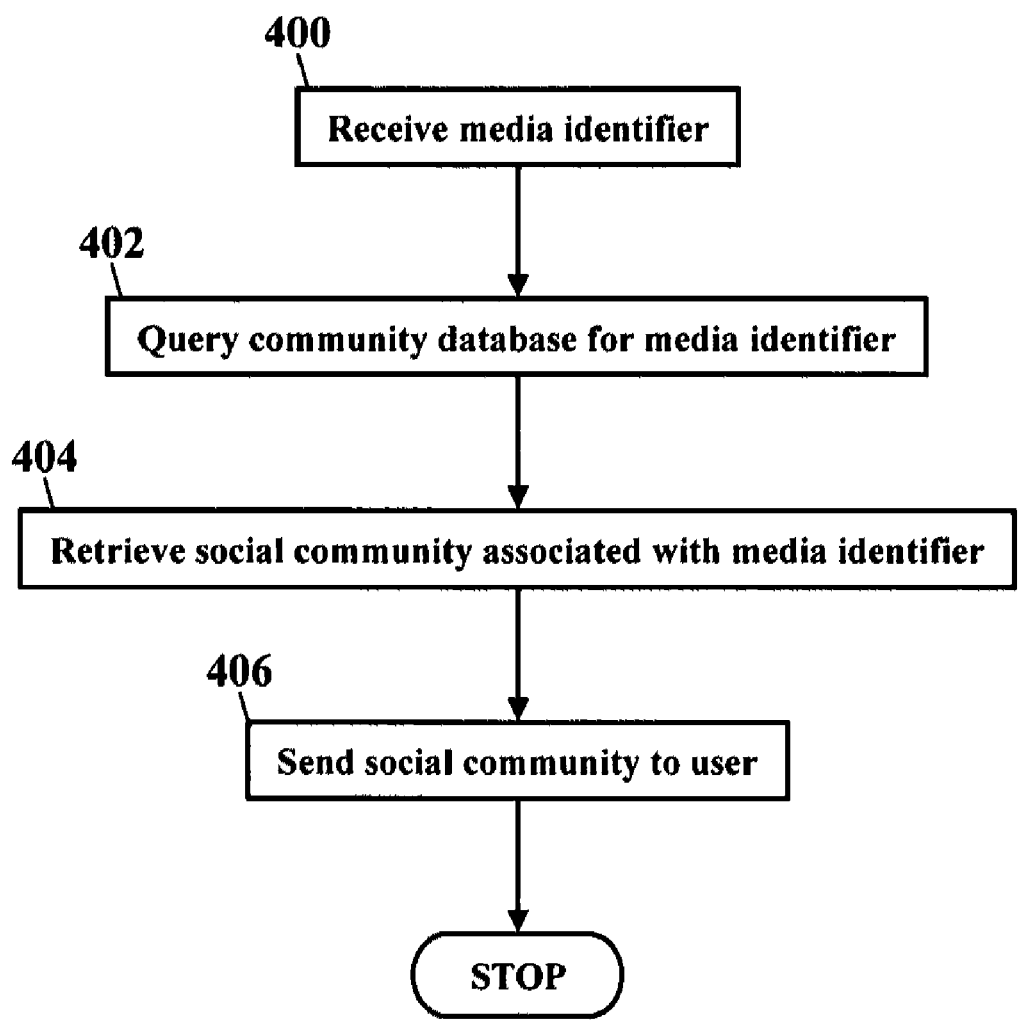
FIG. 14 is a flowchart illustrating a method for recommending social communities, according to more exemplary embodiments.

FIG. 14 is a flowchart illustrating a method for recommending social communities, according to more exemplary embodiments. A media identifier 58 is received that identifies media scheduled for recording by a user's device 20 (Block 400). A community database 70 may be queried for the media identifier 58, and the community database 70 associates social communities to media identifiers (Block 402). A social community (such as a server or network address) associated with the media identifier 58 is retrieved (Block 404) and sent to the user (Block 406).

Figure 15:
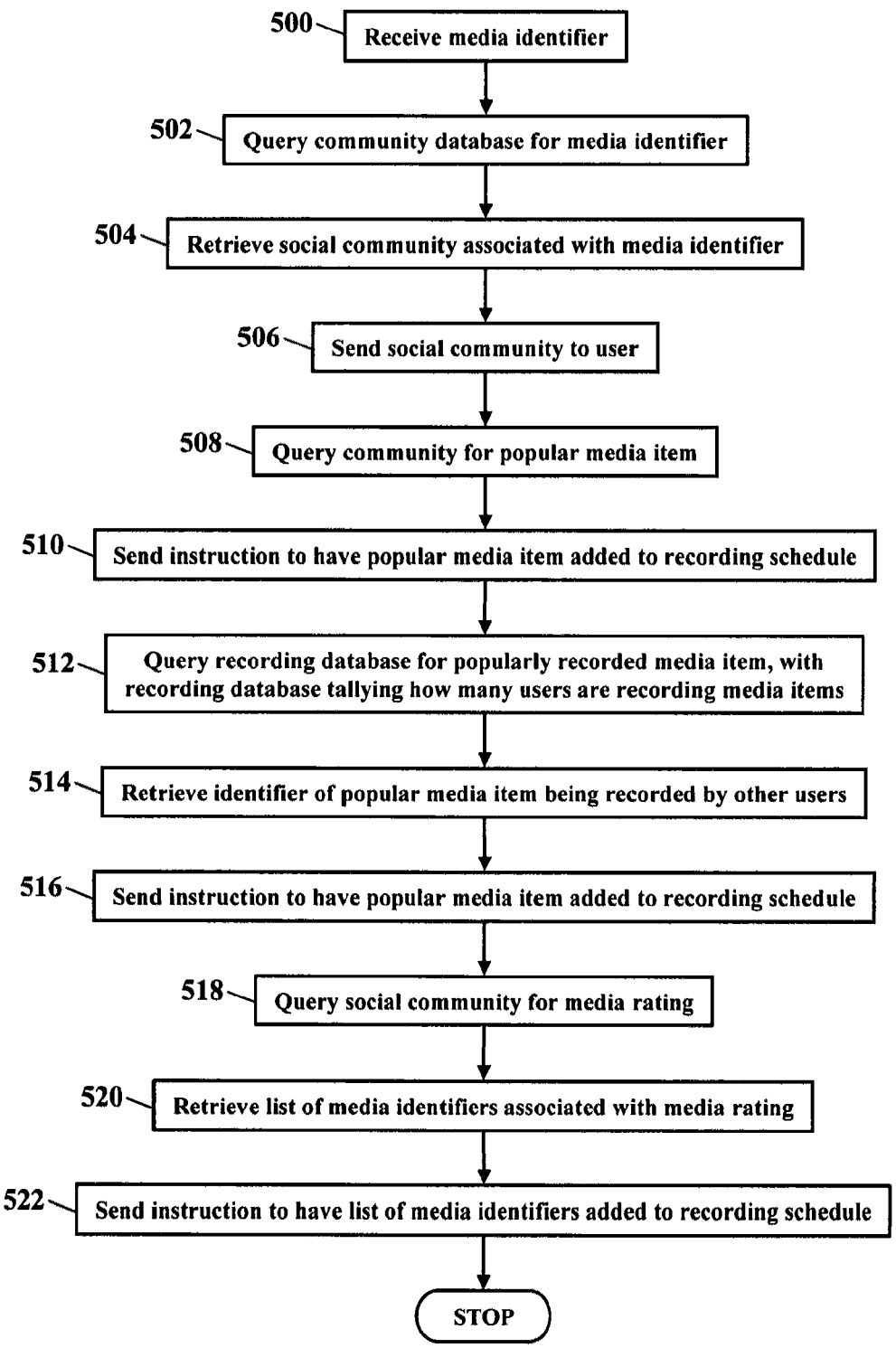
FIG. 15 is another flowchart illustrating another method for recommending social communities, according to more exemplary embodiments.

FIG. 15 is another flowchart illustrating another method for recommending social communities, according to more exemplary embodiments. A media identifier 58 is received (Block 500). A community database 70 may be queried for the media identifier 58 (Block 502). A social community is retrieved (Block 504) and sent to the user (Block 506). The social community may be queried for a popular media item (Block 508). An instruction may be sent to have the popular media item added to a recording schedule (Block 510). A recording database may be queried for a popularly recorded media item, with the recording database tallying how many users are recording media items (Block 512). An identifier of a popular media item that is being recorded by other users is retrieved (Block 514). An instruction is sent to have the popular media item added to the recording schedule (Block 516). The social community may be queried for a media rating (Block 518) and a list of media identifiers 58 is retrieved that is associated with the media rating (Block 520). An instruction may be sent to have the list of media identifiers 58 added to a recording schedule (Block 522). An instruction may additionally or alternatively be sent to download each media item listed in the list of media identifiers 58 to populate the user's device.

FIG. 16 is a flowchart illustrating another method for recommending social communities, according to more exemplary embodiments. A user identification 102 may be received (Block 600). A buddy database 104 may be queried for the user identification 102 (Block 602). A buddy's user identification, associated with the user identification 102, is retrieved (Block 604). A community membership database 110 is queried for the buddy's user identification, with the community membership database 110 associating user identifications to membership listings of social communities (Block 606). The buddy's social community (associated with the buddy's user identification) is retrieved (Block 608) and sent to the user (Block 610). An instruction may be sent to add the user identification to a membership listing associated with the buddy's social community (Block 612). When a recording cancellation message is received that indicates the media has been removed from a recording schedule, then the user identification is removed from the membership listing associated with the buddy's social community (Block 614).

The recording application 28 and/or the community application 56 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the

What is claimed is:

1. A method for recommending a social community, comprising:
    receiving a recording schedule at a server, the recording schedule having entries identifying content scheduled for recording by a user's device, the recording schedule comprising a media identifier of the content to be recorded, a subject matter associated with the media identifier, a date and time of recording, and a channel from which the content may be retrieved;
    discarding the date and time of recording and the channel from the recording schedule to leave only the media identifier of the content to be recorded;
    extracting the media identifier from the recording schedule;
    querying a community database that stores a table that maps social communities to different subject matters;
    retrieving a listing of communities from the community database that is associated with the subject matter;
    retrieving a website address for each social community in the listing of communities;
    sending the website address to the user's device;
    receiving a minimum threshold rating for recommendations from a profile;
    querying the social community for popular content that satisfies the minimum threshold rating;
    retrieving a recommended media identifier that is recommended by the social community and that satisfies the minimum threshold rating;
    creating a new entry in the recording schedule to record the popular content represented by the recommended media identifier;
    tallying how many users are recording a media item;
    querying a recording database for a popular media item scheduled for recording that satisfies the minimum threshold rating;
    receiving a popular media identifier that corresponds to the popular media item and that satisfies the minimum threshold rating; and
    creating another new entry in the recording schedule to record the popular media item identified by the popular media identifier.

2. The method according to claim 1, further comprising retrieving a domain name of the social community.

3. The method according to claim 1, wherein retrieving the website address comprises retrieving a server address.

4. The method according to claim 1, further comprising:
    receiving a user identification associated with the recording schedule; and
    querying a buddy database for the user identification.

5. The method according to claim 1, further comprising retrieving a buddy associated with the user identification.

6. The method according to claim 1, further comprising receiving a recording cancellation message indicating the content has been canceled for recording.

7. The method according to claim 1, further comprising retrieving a membership listing associated with the social community.

8. The method according to claim 1, further comprising sending an instruction to add the popular content to the recording schedule.

9. The method according to claim 1, further comprising removing an entry from the recording schedule.

10. The method according to claim 1, further comprising:
    associating the media identifiers to media ratings in the community database;
    querying the community database for a media rating; and
    retrieving a list of media identifiers associated with the media rating.

11. The method according to claim 10, further comprising sending an instruction to the user's device to add the list of media identifiers to the recording schedule.

12. The method according to claim 11, further comprising sending an instruction to the user device to download each media item listed in the list of media identifiers to populate the user's device.

13. The method according to claim 1, wherein when a response from the community database indicates that no community is associated with the subject matter, then prompting to create a new social community.

14. A system, comprising:
    a processor;
    memory; and
    code stored in the memory that causes the processor at least to:
    receive a recording schedule having entries identifying content scheduled for recording by a user's device, the recording schedule comprising a media identifier of the content to be recorded, a subject matter associated with the media identifier, a date and time of recording, and a channel from which the content may be retrieved;
    discard the date and time of recording and the channel from the recording schedule to leave only the media identifier of the content to be recorded;
    extract the media identifier from the recording schedule;
    query a community database that stores a table that maps social communities to different subject matters;
    retrieve a listing of communities from the community database that is associated with the subject matter;
    retrieve a website address for each social community in the listing of communities;
    send the website address to the user's device;
    receive a minimum threshold rating for recommendations from a profile;
    query a social community for popular content that satisfies the minimum threshold rating;
    retrieve a recommended media identifier that is recommended by the social community and that satisfies the minimum threshold rating;
    create a new entry in the recording schedule to record the popular content represented by the recommended media identifier;
    tally how many users are recording a media item;
    query a recording database for a popular media item scheduled for recording that satisfies the minimum threshold rating;
    receive a popular media identifier that corresponds to the popular media item and that satisfies the minimum threshold rating; and
    create another new entry in the recording schedule to record the popular media item identified by the popular media identifier.

15. The system according to claim 14, wherein the code further causes the processor to retrieve a server address associated with the social community.

16. The system according to claim 14, wherein the code further causes the processor to:
query a buddy database for the user identification; and
retrieve a buddy's user identification from the buddy database that is associated with the user identification.

17. The system according to claim 14, wherein the code further causes the processor to delete an entry from the recording schedule.

18. The system according to claim 17, wherein the code further causes the processor to query for a membership of the social community.

19. A computer readable non-transitory medium storing processor-executable code for performing a method of recommending a social community, the method comprising:
receiving a recording schedule at a server, the recording schedule having entries identifying content scheduled for recording by a user's device, the recording schedule comprising a media identifier of the content to be recorded, a subject matter associated with the media identifier, a date and time of recording, and a channel from which the content may be retrieved;
discarding the date and time of recording and the channel from the recording schedule to leave only the media identifier of the content to be recorded;
extracting the media identifier from the recording schedule;
querying a community database that stores a table that maps social communities to different subject matters;
retrieving a listing of communities from the community database that is associated with the subject matter;
retrieving a website address for each social community in the listing of communities;
sending the website address to the user's device;
receiving a minimum threshold rating for recommendations from a profile;
querying a social community for popular content that satisfies the minimum threshold rating;
retrieving a recommended media identifier that is recommended by the social community and that satisfies the minimum threshold rating;
creating a new entry in the recording schedule to record the popular content represented by the recommended media identifier;
tallying how many users are recording a media item;
querying a recording database for a popular media item scheduled for recording that satisfies the minimum threshold rating;
receiving a popular media identifier that corresponds to the popular media item and that satisfies the minimum threshold rating; and
creating another new entry in the recording schedule to record the popular media item identified by the popular media identifier.

* * * * *